United States Patent [19]
Brown

[11] Patent Number: 4,693,520
[45] Date of Patent: Sep. 15, 1987

[54] AUTOMOTIVE VEHICLE WHEEL WITH NON-SUPPORTING SPOKES

[75] Inventor: Raymond C. Brown, Tarzana, Calif.

[73] Assignee: Superior Industries International, Inc., Van Nuys, Calif.

[21] Appl. No.: 831,503

[22] Filed: Feb. 21, 1986

[51] Int. Cl.⁴ .............................................. B60B 7/04
[52] U.S. Cl. ............................... 301/37 SS; D12/205; 301/67
[58] Field of Search ............... 301/9 SB, 37 R, 37 SS, 301/54, 55, 65, 63 R, 66, 67, 58, 59, 104; D12/205, 211

[56] References Cited

U.S. PATENT DOCUMENTS

| D. 272,897 | 3/1984 | Chapman | D12/211 |
|---|---|---|---|
| 1,819,865 | 8/1931 | Brennen | 301/54 X |
| 1,862,805 | 6/1932 | Pugh | 301/54 X |
| 2,711,349 | 6/1955 | Groven | 301/37 SS |
| 2,712,474 | 7/1955 | Gaylord | 301/37 R |
| 4,180,293 | 12/1979 | Norris et al. | 301/54 |
| 4,286,824 | 9/1981 | Brown | 301/104 X |
| 4,385,785 | 3/1983 | Morris et al. | 301/37 SS |
| 4,398,770 | 8/1983 | Smith | 301/37 SS |

FOREIGN PATENT DOCUMENTS 347089  4/1931  United Kingdom ................. 301/58

Primary Examiner—David A. Scherbel
Attorney, Agent, or Firm—Fulwider, Patton, Rieber, Lee & Utecht

[57] ABSTRACT

An automotive vehicle wheel having a solid body that includes a hub and a radially outwardly extending bolt-on flange that merges into a tire-receiving rim wherein the flange is formed with a plurality of pockets or windows and a set of spoke elements is disposed within all or some of the pockets or windows.

19 Claims, 16 Drawing Figures

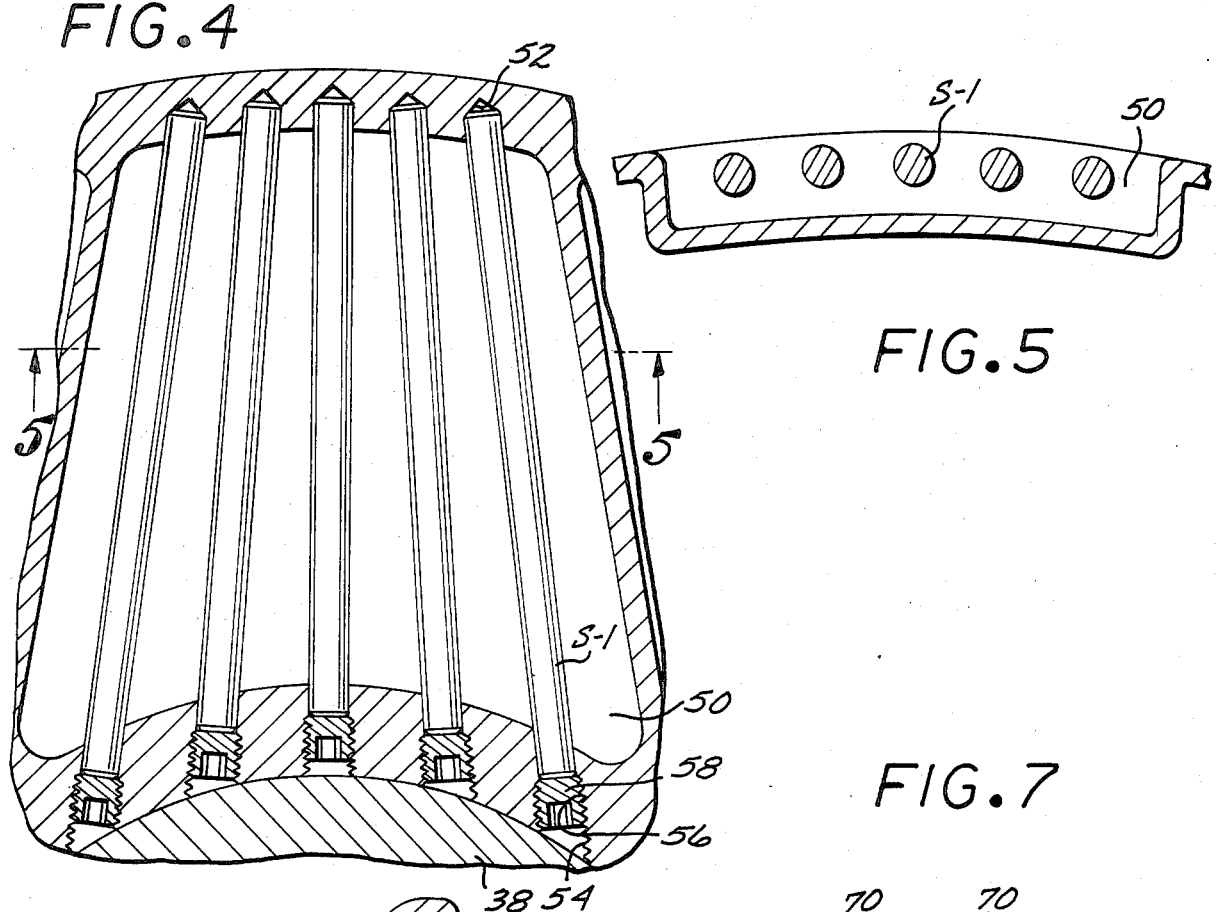
FIG. 4
FIG. 5
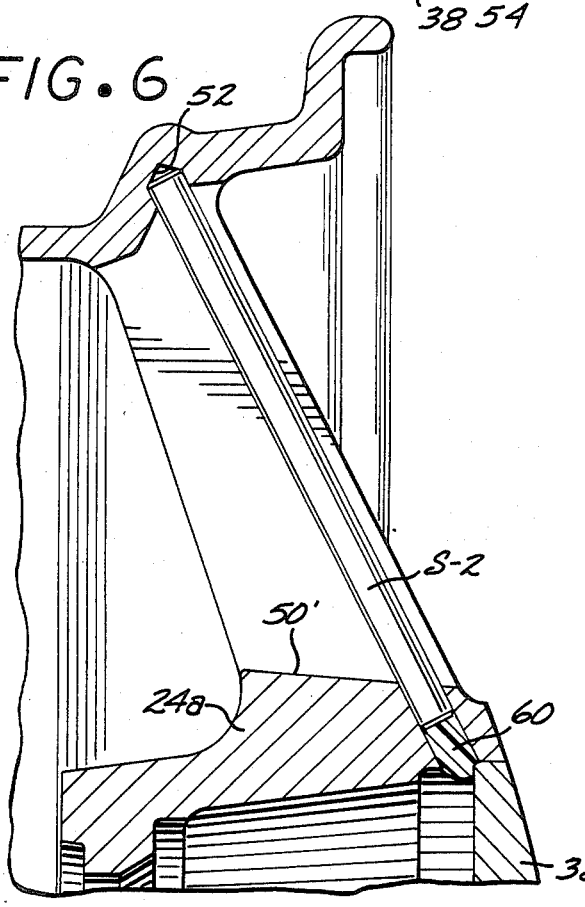
FIG. 6
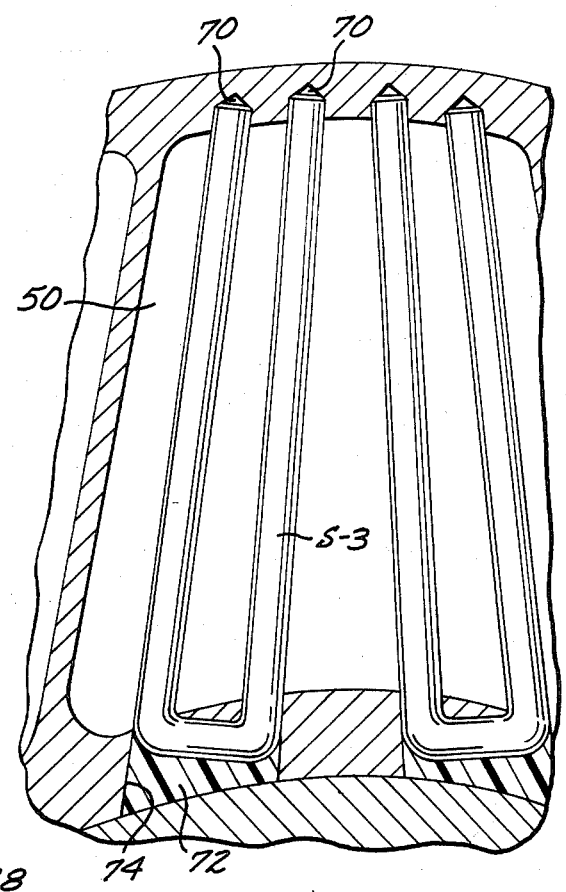
FIG. 7

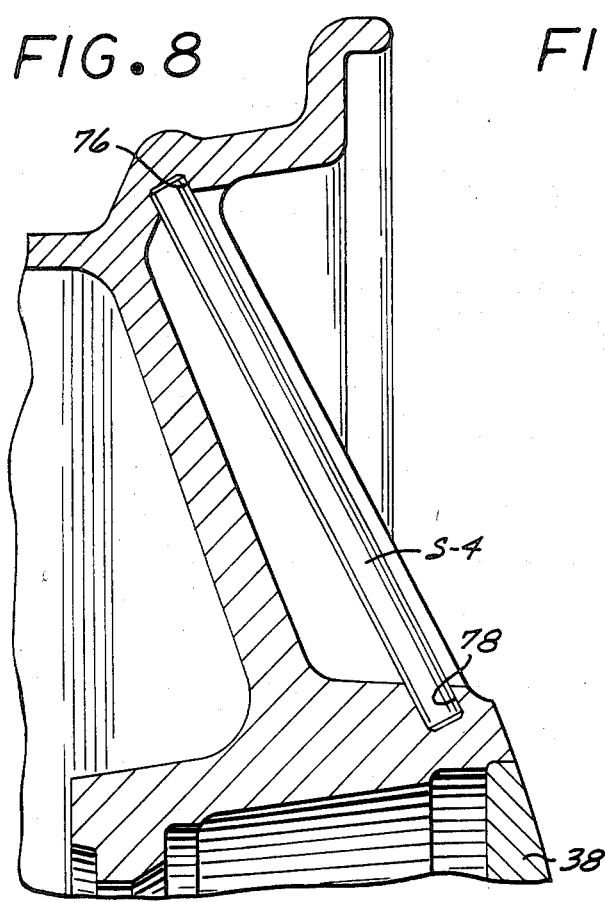
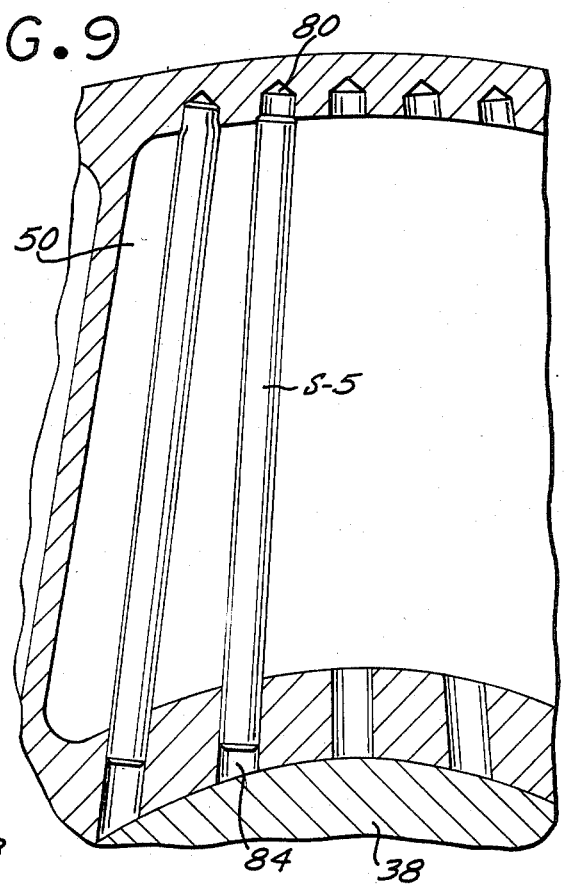
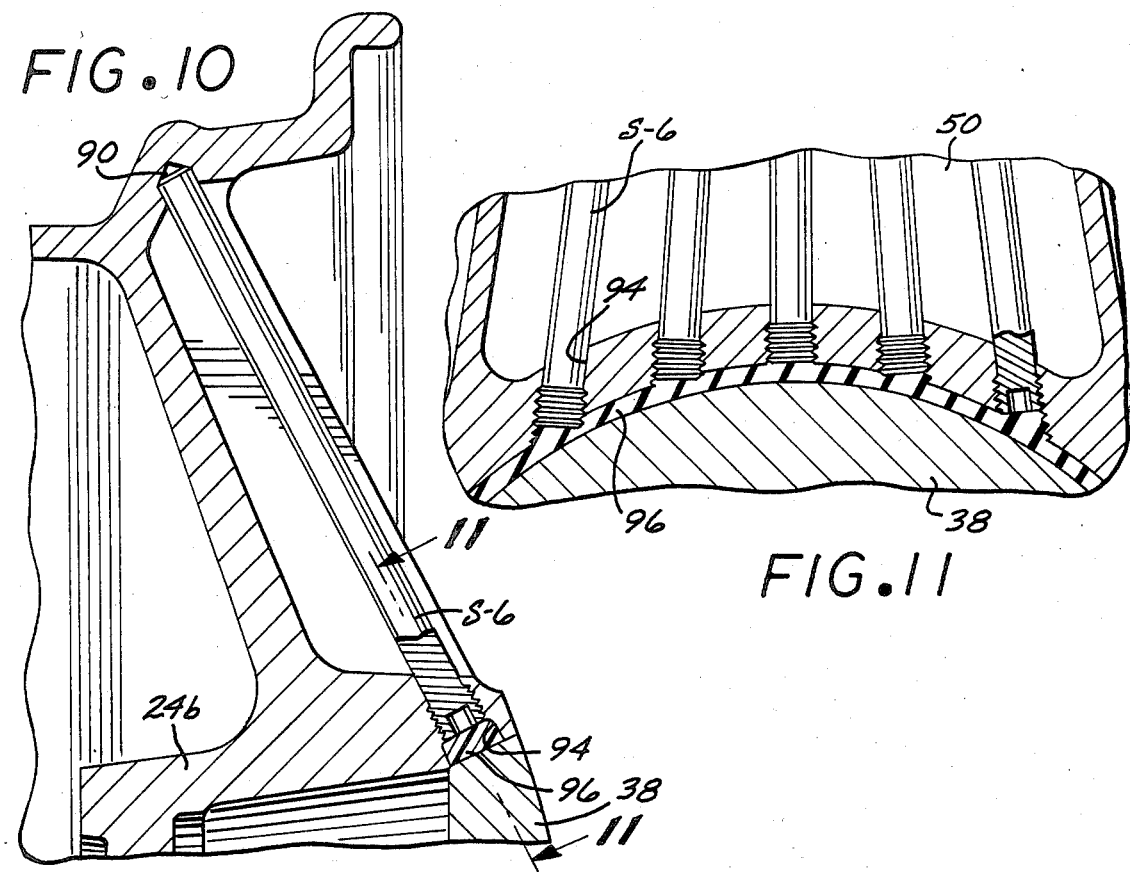

AUTOMOTIVE VEHICLE WHEEL WITH NON-SUPPORTING SPOKES

BACKGROUND OF THE INVENTION

Authentic wire spoke wheels for automotive vehicles, while attractive, are subject to several disadvantages not inherent to conventional plain wheels, e.g. high initial and maintenance costs and susceptibility to damage. Such authentic wire spoke wheels, however, have great aesthetic appeal to consumers. As a result, various types of simulated wire spoke type wheels have been offered to car owners. By way of example, wire baskets having simulated spokes and attachable to conventional plain wheels have proven popular. Such wire basket type wheels, however, add weight to a plain wheel, and additionally tend to rattle after a period of use. There have also been provided synthetic plastic wheel covers having simulated spoke designs. Such wheel ornaments, however, lack an authentic appearance.

SUMMARY OF THE INVENTION

It is a major object of the present invention to provide an automotive vehicle wheel combining the advantages of a conventional solid wheel body with the aesthetic appeal of a wheel employing spokes.

Another object of the present invention is to provide an automotive vehicle wheel of the aforedescribed nature which is economical to manufacture, rugged of construction and which will afford a long and trouble-free service life.

A more particular object of the present invention is to provide an automotive vehicle wheel having a solid body that includes a hub portion, a radially extending bolt-on flange which extends radially outwardly from the hub portion to merge into a tire-receiving rim, wherein a plurality of pockets are formed in the bolt-on flange portion to receive a set of spoke elements. The pockets or windows may be either of closed or open construction. Additionally, the spoke elements may be either permanently or detachably secured to the wheel body.

Yet a further object of the present invention is to provide an automotive vehicle wheel of the aforedescribed nature which is usable with a hubcap which conceals the attachment of the spoke elements to the wheel.

Another object of the present invention is to provide an embodiment of the automotive vehicle wheel of the aforedescribed nature wherein the spoke elements are recessed inwardly of the pockets or windows so as to prevent damage from inadvertent contact with curbs or like obstructions.

It is an additional object of the present invention to provide an automotive vehicle wheel of the aforedescribed nature which lends itself to many different configurations and combinations of pockets or windows and spoke elements to thereby appeal to the aesthetic taste of various different purchasers.

These and other objects and advantages of the present invention will become apparent from the following detailed description taken in conjunction with the accompanying drawings.

BRIEF DESCRIPTION OF THE DRAWINGS

FIG. 4 is a broken sectional view taken on line 4—4 of FIG. 3.

FIG. 5 is a sectional view taken on line 5—5 of FIG. 4.

FIG. 6 is a sectional view similar to FIG. 4, but showing a second embodiment of an automotive vehicle wheel embodying the present invention utilizing open pockets and a second form of spoke element.

FIG. 7 is a view similar to FIG. 4, but showing a wheel employing generally U-shaped spoke elements.

FIG. 8 is a view similar to FIG. 3 showing the spoke elements cast in place with the wheel body.

FIG. 9 is a view similar to FIG. 4 showing spoke elements press fit in place within their respective pockets.

FIGS. 10 and 11 are views similar to FIGS. 3 and 4, respectively, but showing spoke elements secured in place by a resilient ring plug arranged within the hub portion of the wheel.

DESCRIPTION OF PREFERRED EMBODIMENTS

Figure 1:
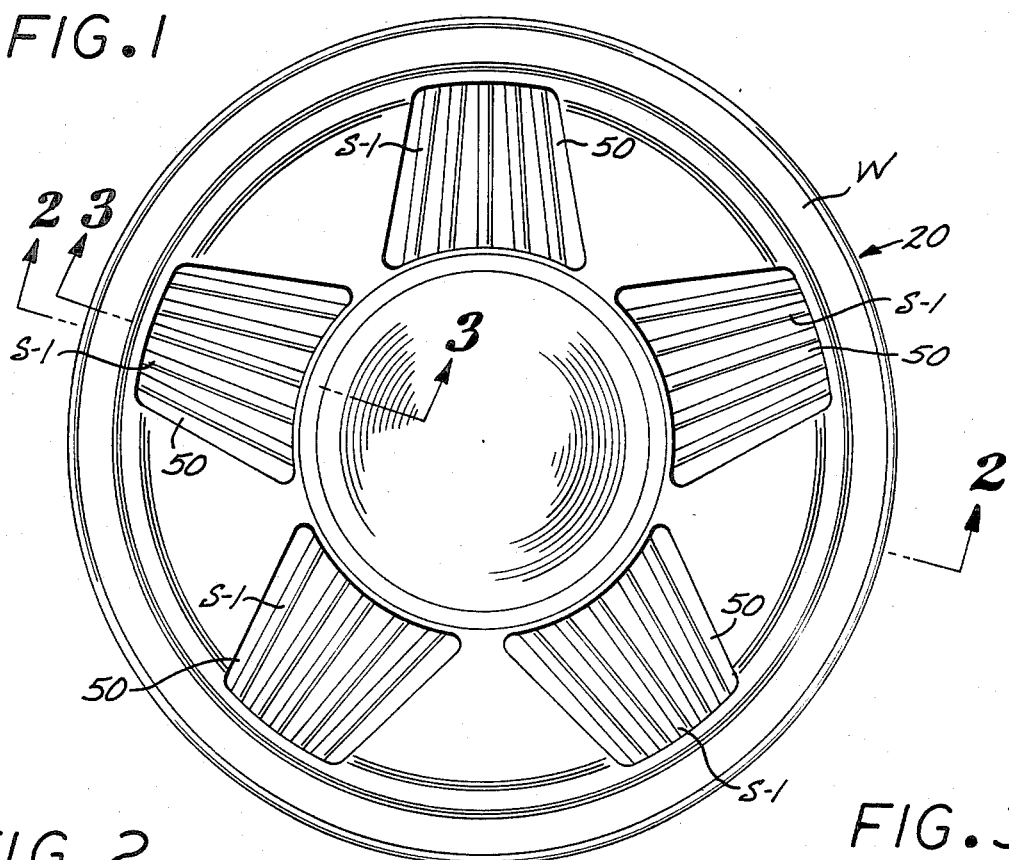
FIG. 1 is a side elevational view showing the exterior of a preferred form of automotive vehicle wheel embodying the present invention utilizing closed pockets and removable spoke elements.
Figure 2:
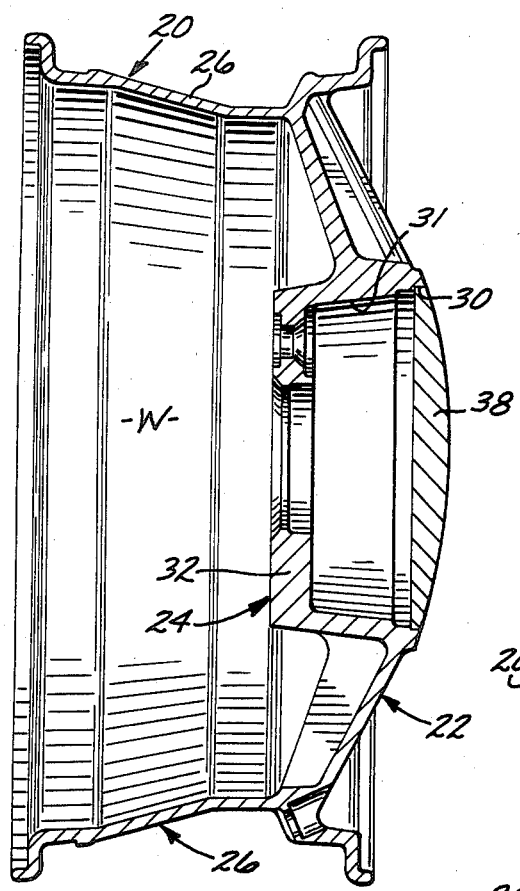
FIG. 2 is a sectional view taken along 2—2 of FIG. 1.
Figure 3:
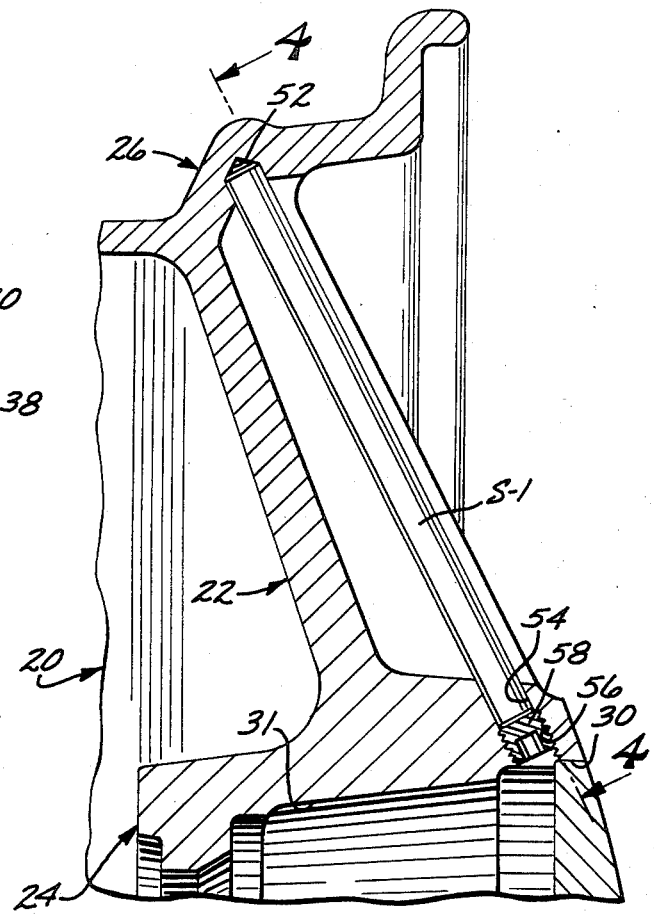
FIG. 3 is a sectional view taken in enlarged scale along line 3—3 of FIG. 1.

Referring to the drawings, and particularly FIGS. 1-5, there is shown a preferred form of automotive vehicle wheel W embodying the present invention. The wheel includes a rigid body, generally designated 20, having a generally radially outwardly and rearwardly extending bolt-on flange, generally designated 22, formed at its radially inner end with a hub portion, generally designated 24, and merging at its radially outer portion into a conventional multi-flange drop center tire rim 26. The hub portion 24 of the bolt-on flange 22 is secured upon the brake drum (not shown) of an automotive vehicle in a conventional manner by lug bolts (not shown). Preferably, the wheel body 20 is of integral cast aluminum construction thereby affording maximum strength, flexibility of design, minimum cost of manufacture and minimum weight compared to other types of bodies. However, such wheel may also be of forged, extruded or spun construction and may be fabricated from other materials, such as steel or magnesium alloy.

Hub portion 24 is generally cup-shaped having a circumferential groove 30 formed at its outer portion outwardly of axle opening 31 and being formed with a rear wall 32 provided with a plurality of circumferentially spaced lug bolt-receiving apertures 36. A hubcap 38 is frictionally removably secured within groove 30 in a conventional manner.

More particularly, the bolt-on flange 22 is formed with a plurality of equidistantly circumferentially spaced, like pockets or windows 50 which project rearwardly from the frontal surfaces of the flange 22. Such pockets or windows are seen to be of generally trapezoidal configuration when viewed from the side of the wheel W. The front portion of the pockets or windows 50 receive a set of generally radially extending straight spoke elements designated S-1 in FIGS. 1-5. Such spoke elements S-1 extend in a generally radial direction between the front part of hub portion 24 and the intermediate part of the tire rim 26. In the embodiment of FIGS. 1-5, the radially outer ends of each spoke elements S-1 are slideably received within a vertically inclined blind outer passage 52 formed in tire rim 26. The radially inner end of the individual spoke elements S-1 extend into a vertically inclined inner passage 54 formed in the front part of hub portion 24. The radially inner length of passage 54 is provided with internal threads 56 which are engaged by complimentary threads 57 formed on set screws 58 which are screwed into threads 56 to engage the radially inner end of spoke elements S-1 so as to removably retain the spokes in place. This arrangement provides for simple and quick installation of the spoke elements S-1. To install such spoke elements, with the hubcap 38 removed, it is only necessary to extend each spoke element radially outwardly through the hub portion inner passage 54 until the radially outer end of the spoke element is received within blind passage 52. Therafter, the set screw 58 is rotated so that the threads thereof mate with the threads 56 of inner passage 54. It should be noted that this arrangement permits individual spoke elements to be readily replaced if damaged. Additionally, it should be noted that when the hubcap 38 is in place, it conceals the connection between the radially inner portion of the spoke elements and the hub portion.

It is important to observe that the pockets 50 may be of open rather than closed configuration and the spokes are disposed within the front portion of the pockets. Thus, referring to FIG. 6 there is shown a second embodiment of the automotive vehicle wheel wherein the pockets 50 are of open rather than closed configuration to define an open window. With this arrangement, a different aesthetic feeling is provided by the assembled wheel. Additionally, the open pockets or windows permit venting of the brakes and reduce thee weight of the wheel. At the same time, th spoke elements S-2 assist in concealing the undercarriage components, such as brake drums, rotors, and calipers (not shown). Such concealment is particularly desirable when these undercarriage components become rusted, dirty or greasy.

Referring again to FIG. 6, the spoke elements S-2 are similar to the aforedescribed spoke elements S-1, except that the radially inner part of each spoke element is not threadably secured to the hub portion 4a. Instead, the spoke elements are held in place by a removable plug 60 which may be formed of silicone rubber or a like resilient material which is positioned within the radially inner part of the inner passage 62. The relative dimensions of the plug 60 and the passage 62 should be such that the plug may be resiliently and removably wedged within such passage. It will be noted that the hubcap 38 serves to conceal the passage 60 when the hubcap is in place. As with the aforedescribed embodiment of FIGS. 1-5, the spoke elements S-2 may be readily installed and removed from the wheel by merely dislodging and then replacing plugs 60.

Referring now to FIG. 7, there is shown another form of spoke element S-3 embodying the present invention. In this embodiment, each pocket or window 50 is provided with a pair of U-shaped spoke elements S-3. The radially outer ends of the spoke elements are received within blind passages 70, while the radially inner ends thereof are embedded in a plug 72 of silicone rubber or the like, which in turn is removably wedged within inner passages 84 formed in the hub portion of the wheel.

Referring now to FIG. 8, there is shown another form of spoke element mounting arrangement. In this arrangement, the spoke elements S-4 are cast in place when the wheel body 20 is formed. After casting, the radially outer and inner ends of the spoke elements remain rigidly embedded in the cast material within blind passages 76 and 78. This construction is rattle-free.

Referring now to FIG. 9, there is shown another arrangement for mounting the spoke elements S-5 in their respective pockets or windows 50. In this arrangement the radially outer ends of each spoke element is press fit into an outer blind passage 80 having a slightly smaller diameter than the outer diameter of the spoke elemnts. The hub portion 24 is provided with radially extending inner passages 84 through which the spoke elements are urged into position to be press fitted into the blind passages 80. Installation of the hubcap 38 will conceal the radially inner portion of the inner passages 84.

Referring now to FIGS. 10 and 11, spoke elements S-6 are shown with their radially outer ends disposed within outer blind passages 90 after having been slid into place through radially extending inner passages 92 formed in the hub portion 24b. The radially inner portions of each inner passage 92 is threaded at 93 to receive the threaded inner ends of spoke S-6. The hub portion is formed with an annular passage 94 which removably receives a resilient mounting ring 96 formed of silicone rubber or the like. Alternatively, a spring ring (not shown) may be utilized which when installed in place in passage 94 holds tension against the inner ends of the spokes. The relative dimensions of the inner passage 94 and the ring should be so selected that the ring is removably wedgeably received within the passage. Installation of the hubcap 38 conceals the mounting ring 96.

Figure 12:
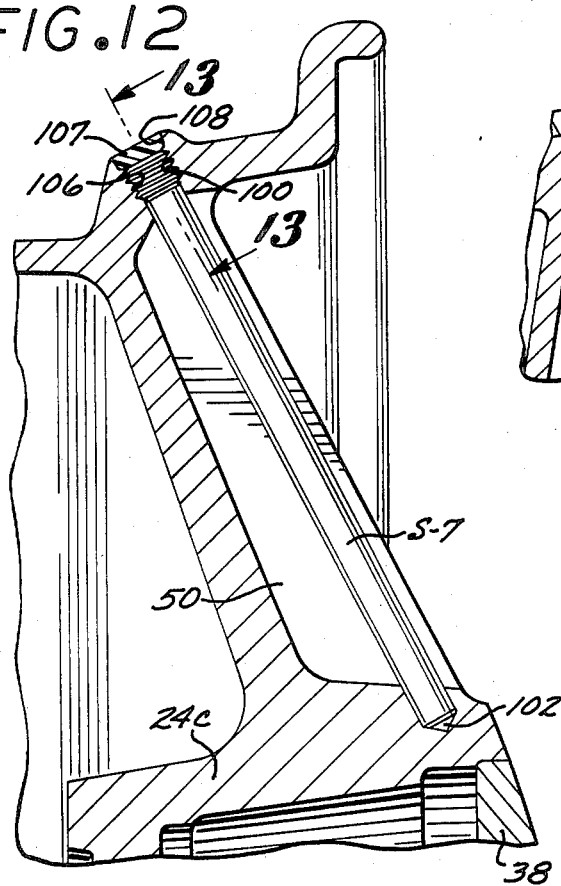
FIGS. 12 and 13 show a form of said automotive vehicle wheel wherein the radially outer ends of the spoke elements are threadably secured to the tire-receiving rim.
Figure 13:
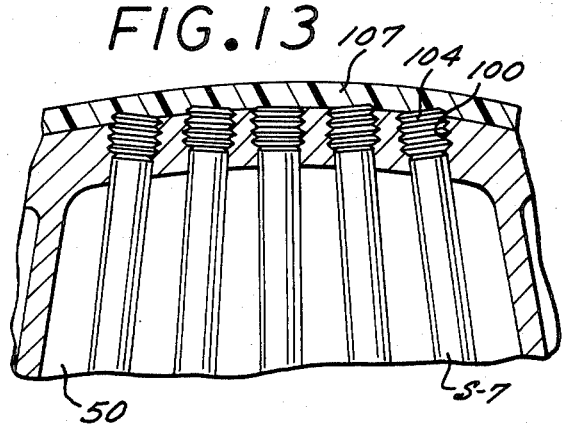

Referring now to FIGS. 12 and 13, spoke elements S-7 are inserted in a radially inward direction through a threaded outer passage 100 formed in the tire rim 26 so as to have their radially inner ends removably inserted within an inner blind passage 102 formed in the hub portion 24c of the wheel. Each spoke elements S-7 is formed with threads 104, complimentary to internal threads 106 formed in the outer passage 100. The mating of the threads 104 and 106 removably secure the spoke elements in place. It will be apparent that the spoke elements may be readily removed by merely unscrewing the radially outer portion thereof from their respective threaded passages 100. A resilient sealing ring 107 is disposed within an annular groove 108 that extends around tire rim 2 radially outwardly of outer passages 100.

Figure 14:
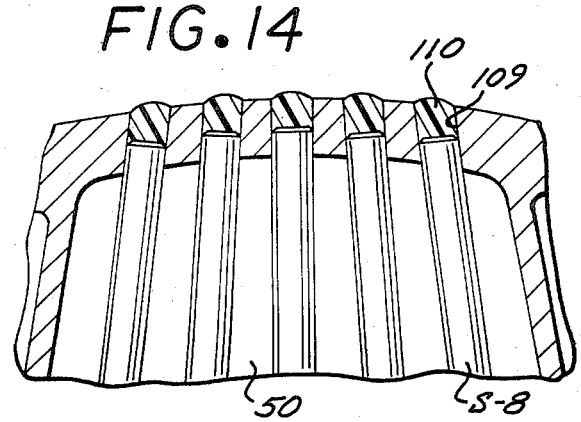
FIG. 14 shows a form similar to FIGS. 12 and 13 wherein the radially outer ends of the spoke elements are secured to the rim by a resilient plug.

FIG. 14 shows a spoke mounting arrangement similar to that of FIGS. 12 and 13, except that the radially outer ends of the spoke elements S-8 are each removably secured in outer passages 109 by a resilient plug 110 formed of silicone rubber or the like. Again, the spoke elements may be readily removed by withdrawal of their respective plugs from passages 108. The radially inner ends of the spoke elements may be removably inserted into blind passages (not shown) formed in the hub portion.

Figure 15:
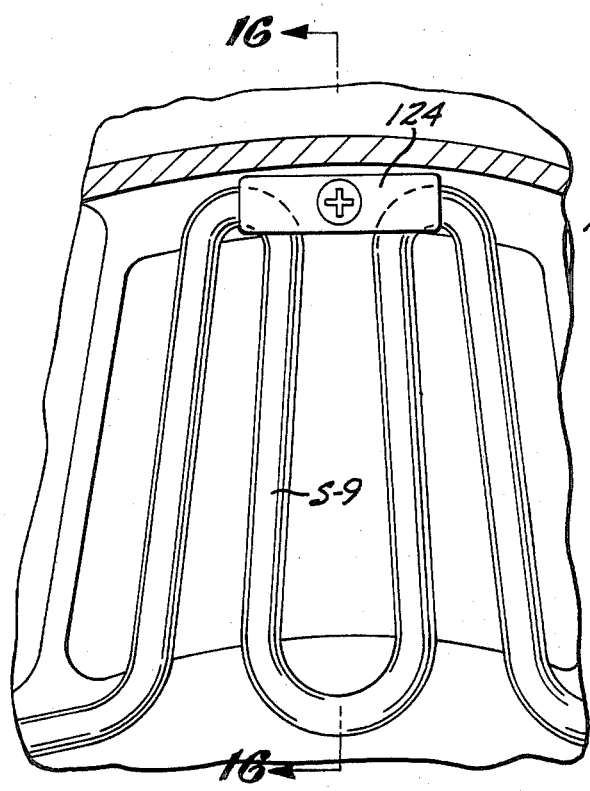
FIGS. 15 and 16 show spoke elements made up of a single length of rod and positioned inwardly of their respective open pockets.
Figure 16:
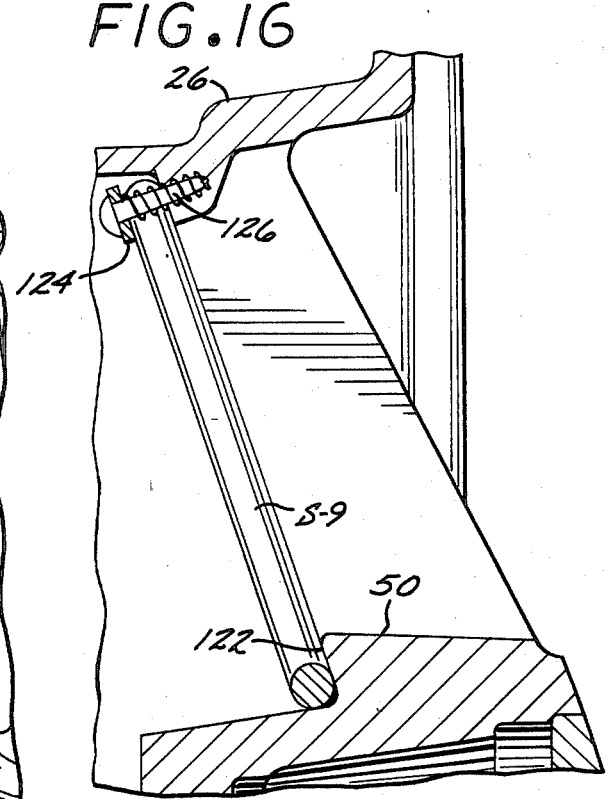

Referring to FIGS. 15 and 16, there is shown a spoke mounting arrangement utilizing individual sets of spoke elements S-9 of a generally M-shaped configuration disposed within each pocket 50. The radially inner portions of each spoke element abuts the front end of an annular passage 122 formed in the wheel's hub portion. The midportion of each spoke element is removably held in place by a rectangular clip 124 which is secured to a lug 126 formed on tire rim 26 by a metal screw 128. The pocket 50 of this wheel embodiment is open so that the spoke element S-9 is visible from the outside of the wheel. Positioning of the spoke element inwardly of the open pocket 50 protects the spoke element from damage by inadvertent contact of the wheel with a curb or other obstruction.

It should be understood that the aforedescribed spoke elements may be formed of different materials, such as steel, aluminum or plastic. Also, the spoke elements may be of wire, rod or tubing. Any number and size of spoke elements can be employed in many configurations and positions relative to the closed or open pockets or windows. It should also be understood that spokes may be positioned in less than all of the pockets. As a result, the appearance of a wheel embodying the present invention can be varied so as to appeal to the aesthetic tastes of various different purchasers. Yet, the cost of manufacturing and maintaining such wheels can be comparatively low. Note, additionally, that the spoke elements can be easily replaced should they be damaged.

Various modifications and changes may be made with respect to the foregoing detailed description without departing from the spirit of the present invention.

What is claimed is:

1. In an automotive vehicle wheel having a body that includes a hub portion and a radially extending bolt-on flange portion which extends radially outwardly and rearwardly from the hub portion to merge into a tire-receiving rim portion, the combination of;
   a plurality of pockets formed in the bolt-on flange portion, said pockets projecting rearwardly from the frontal surfaces of said flange portion;
   a single set of generally radially extending and rearwardly straight spoke elements disposed solely within the front portion of some or all of said pockets; and
   attachment means securing the radially outer end of each of said spoke elements to said rim portion and the radially inner end of said spoke elements to said hub portion.

2. The automotive vehicle wheel of claim claim 1 wherein the pockets are open to define windows.

3. The automotive vehicle wheel of claim 2 wherein the radially inner and outer ends of said spoke elements are disposed within outer and inner passages formed in said rim and hub portions, respectively.

4. The automotive vehicle wheel of claim 3 wherein said inner passages are open to removably receive said spoke elements and are provided with locking means to retain said spoke elements within said passages and wherein said hub portion is adapted to receive a hubcap that conceals said inner passages.

5. The automotive vehicle wheel of claim 1 wherein the radially inner and outer ends of said spoke elements are disposed within passages formed in said hub and rim portions, respectively.

6. The automotive vehicle wheel of claim 5 wherein said attachment means include threads interposed between one end of said spoke elements and its respective passage.

7. The automotive vehicle wheel of claim 6 wherein the passage opposite the threaded passage is blind and removably telescopically receives the end of each spoke element opposite that which engages the threaded passage.

8. The automotive vehicle wheel of claim 6 wherein each inner passage is open to removably receive its spoke element, said inner passage and spoke element are threaded, and said hub portion is adapted to receive a hubcap that conceals said inner passages.

9. The automotive vehicle wheel of claim 5 wherein said attachment means include a resilient plug removably disposed within one of said passages radially away from and abutting one end of each spoke element.

10. The automotive vehicle wheel of claim 9 wherein the passage opposite the plug is blind and removably telescopically receives the end of the spoke element opposite that which abuts the plug.

11. The automotive vehicle wheel of claim 9 wherein each inner passage is open to removably receive its spoke element whereafter said plug is disposed within said inner passage abutting its spoke element.

12. The automotive vehicle wheel of claim 11 wherein the hub portion is adapted to receive a hubcap that conceals said inner passages.

13. In an automotive vehicle wheel having a body that includes a hub portion and a radially and rearwardly extending bolt-on flange portion which extends radially outwardly from the hub portion to merge into a tire-receiving rim portion, the combination of:
   a plurality of open pockets formed through the bolt-on flange portion;
   a set of generally radially and rearwardly extending straight spoke elements disposed solely within the front portion of each of said pockets; and
   attachment means securing the radially outer end of each of said spoke elements to said rim portion and the radially inner end of said spoke elements to said hub portion.

14. The automotive vehicle wheel of claim 13 wherein the radially inner ends of said spoke elements are removably disposed in a passage formed in the hub portion, and the radially outer end of said spoke elements are secured to the tirereceiving means by threaded attachment means.

15. In an automotive vehicle wheel having a body that includes a hub portion and a radially extending bolt-on flange portion which extends radially outwardly from the hub portion to merge into a tire-receiving rim portion, the combination of:
   a plurality of pockets formed in the bolt-on flange portion;
   a set of generally radially extending spoke elements disposed within some or all of said pockets; the radially inner and outer ends of said spoke elements being disposed within passages formed in said hub and rim portions, respectively; and
   attachment means securing the radially outer end of each of said spoke elements to said rim portion and the radially inner end of said spoke elements to said hub portin; said attachment means including a resilient plug removably disposed within one of said passages radially away from and abutting one end of each spoke element.

16. The automotive vehicle wheel of claim 15 wherein each inner passage is open to removably receive its spoke element, said inner passage and spoke element are threaded and said hub portion is adapted to receive a hubcap that conceals said inner passages.

17. In an automotive vehicle wheel having a body that includes a hub portion and a radially extending bolt-on flange portion which extends radially outwardly from the hub portion to merge into a tire-receiving rim portion, the combination of;
a plurality of pockets formed in the bolt-on flange portion;
a set of generally radially extending spoke elements disposed within some or all of said pockets; the radially inner and outer ends of said spoke elements being disposed within passages formed in said hub and rim portions, respectively; and
attachments means securing the radially outer end of each of said spoke elements to said rim portion and the radially inner end of said spoke elements to said hub portion; said attachment means including threads interposed between one end of said spoke elements and its respective passage, with the passage opposite the threaded passage being blind to removably telescopically receive the end of each spoke element opposite that which engages the threaded passage.

18. The automotive vehicle wheel of claim 17 wherein each inner passage is open to removably receive its spoke element whereafter said plug is disposed within said inner passage abutting its spoke element.

19. The automotive vehicle wheel of claim 18 wherein the hub portion is adapted to receive a hubcap that conceals said inner passages.

* * * * *